(12) United States Patent
Hochwarth et al.

(10) Patent No.: US 10,417,261 B2
(45) Date of Patent: Sep. 17, 2019

(54) SYSTEMS AND METHODS FOR FLEXIBLE ACCESS OF INTERNAL DATA OF AN AVIONICS SYSTEM

(71) Applicant: GE Aviation Systems LLC, Grand Rapids, MI (US)

(72) Inventors: Joachim Karl Ulf Hochwarth, Caledonia, MI (US); Terrell Michael Brace, Ada, MI (US)

(73) Assignee: General Electric Company, Schenectady, NY (US)

( * ) Notice: Subject to any disclaimer, the term of this patent is extended or adjusted under 35 U.S.C. 154(b) by 547 days.

(21) Appl. No.: 15/210,923

(22) Filed: Jul. 15, 2016

(65) Prior Publication Data
US 2017/0242910 A1 Aug. 24, 2017

Related U.S. Application Data

(60) Provisional application No. 62/296,615, filed on Feb. 18, 2016.

(51) Int. Cl.
G06F 16/00 (2019.01)
G06F 16/28 (2019.01)
(Continued)

(52) U.S. Cl.
CPC .......... *G06F 16/287* (2019.01); *G06F 16/245* (2019.01); *G06F 16/903* (2019.01); *H04B 7/18506* (2013.01)

(58) Field of Classification Search
None
See application file for complete search history.

(56) References Cited

U.S. PATENT DOCUMENTS

| 4,604,711 | A | * | 8/1986 | Benn | ............... | G01C 23/00 701/14 |
| 6,901,377 | B1 | | 5/2005 | Rosenfeld et al. | | |

(Continued)

FOREIGN PATENT DOCUMENTS

WO 2004/045106 A1 5/2004

OTHER PUBLICATIONS

Extended European Search Report and Opinion issued in connection with corresponding EP Application No. dated Jun. 20, 2017.

*Primary Examiner* — Belix M Ortiz Ditren
(74) *Attorney, Agent, or Firm* — Dority & Manning, P.A.

(57) ABSTRACT

The present disclosure provides systems and methods that enable flexible access of internal data of an avionics system (e.g., a Flight Management System). Aspects of the present disclosure enable enhanced, flexible and robust recording of flight test data, testing, debugging, and analyzing in-service problems. One example system includes a Configuration Tool that generates a Loadable Configuration File and a Configuration File based on user selections, structure of data in Data Stores, platform information, processor information, and Receiving Component requirements; a Data Access Component that subscribes to data in the Data Stores based on the Loadable Configuration File and outputs the data; and a Receiving Component receives the data, and decodes the data based at least in part on the Configuration File. Aspects of the present disclosure provide the ability to change which data gets output by the avionics system without the need to recompile and recertify the avionics system software.

17 Claims, 5 Drawing Sheets

(51) Int. Cl.
    *G06F 16/245*     (2019.01)
    *H04B 7/185*     (2006.01)
    *G06F 16/903*     (2019.01)

(56) References Cited

U.S. PATENT DOCUMENTS

| | | |
|---|---|---|
| 7,149,698 B2 | 12/2006 | Guheen et al. |
| 7,386,374 B1 * | 6/2008 | Orf ................. G01C 25/00 340/973 |
| 8,392,534 B2 | 3/2013 | Causse et al. |
| 9,710,313 B2 | 7/2017 | Decker et al. |
| 9,794,340 B2 | 10/2017 | Reed et al. |
| 2010/0217458 A1 * | 8/2010 | Schweiger ........... G06F 3/0481 701/3 |
| 2012/0072482 A1 | 3/2012 | Causse et al. |
| 2013/0046422 A1 * | 2/2013 | Cabos ............... G08G 5/0034 701/3 |
| 2013/0085669 A1 * | 4/2013 | Bailey ............... G08G 5/0039 701/467 |
| 2013/0166135 A1 | 6/2013 | Dunsdon |
| 2014/0013002 A1 | 1/2014 | Holstein et al. |
| 2015/0278071 A1 | 10/2015 | De Mers et al. |
| 2015/0339930 A1 | 11/2015 | McCann et al. |
| 2016/0080517 A1 | 3/2016 | Decker et al. |

\* cited by examiner

SYSTEMS AND METHODS FOR FLEXIBLE ACCESS OF INTERNAL DATA OF AN AVIONICS SYSTEM

PRIORITY CLAIM

The present application claims priority to and the benefit of U.S. Provisional Patent Application Ser. No. 62/296,615, filed Feb. 18, 2016, titled "Systems and Methods for Flexible Access of Internal Data of an Avionics System."

Incorporation by Reference

U.S. Provisional Patent Application Ser. No. 62/296,615, filed Feb. 18, 2016, titled "Systems and Methods for Flexible Access of Internal Data of an Avionics System" is hereby incorporated by reference in its entirety. Commonly owned and copending U.S. patent application Ser. No. 14/486,325, filed Sep. 15, 2015, titled "Mechanism And Method For Communicating Between A Client And A Server By Accessing Message Data In A Shared Memory;" Ser. No. 14/486,336, filed Sep. 15, 2015, titled "Mechanism And Method For Accessing Data In A Shared Memory;" and Ser. No. 14/585,519, filed Dec. 30, 2015, titled "Method And System For Ensuring Integrity Of Critical Data" are hereby incorporated by reference in their entireties.

FIELD OF THE INVENTION

The present subject matter relates generally to avionics systems and, more particularly, systems and methods for flexible access of internal data of an avionics system.

BACKGROUND OF THE INVENTION

Modern aircraft employ complex Flight Management Systems that handle and control large amounts of important data for the aircraft. Presently, in order to access internal data from the Flight Management System, an interface that is defined at compile time in the software is required. However, due to certification requirements and safety concerns, changing or altering this access interface necessitates additional testing and recertification. As a result of the additional testing and recertification requirements, the access interface can be difficult and costly to change. Often these interfaces will have undergone many changes throughout the course of a development program, but are too costly to change once the system is in service.

BRIEF DESCRIPTION OF THE INVENTION

Aspects and advantages of embodiments of the present disclosure will be set forth in part in the following description, or may be learned from the description, or may be learned through practice of the embodiments.

One example aspect of the present disclosure is directed to a method to provide flexible access to internal data of an avionics system. The method includes receiving, by a Data Access Component of the avionics system, a Loadable Configuration File that specifies one or more data Topics selected by a user. The Data Access Component is implemented by one or more processors. The method includes accessing, by the Data Access Component, one or more Data Stores that contain the internal data of the avionics system to retrieve data associated with the one or more data Topics specified by the Loadable Configuration File. The method includes outputting, by the Data Access Component, the retrieved data to a Receiving Component.

Another example aspect of the present disclosure is directed to a method to provide flexible access to internal data of an avionics system. The method includes generating, via a Configuration Tool, a Loadable Configuration File and a Configuration File based on user selections, structure of data in Data Stores, platform information, processor information, and Receiving Component requirements. The method includes subscribing, via a Data Access Component, to data in the Data Stores based on the Loadable Configuration File. The method includes outputting, via the Data Access Component, the data received from the Data Stores. The method includes receiving, via a Receiving Component, the data output by the Data Access Component. The method includes decoding, via the Receiving Component, the data based at least in part on the Configuration File.

Another example aspect of the present disclosure is directed to a system. The system includes a Configuration Tool implemented by one or more processors. The Configuration Tool generates a Loadable Configuration File and a Configuration File based on user selections and at least one of a structure of data in one or more Data Stores, platform information, processor information, and one or more Receiving Component requirements. The system includes a Data Access Component implemented by one or more processors. The Data Access Component subscribes to data in the Data Stores based on the Loadable Configuration File and outputs the data. The system includes a Receiving Component implemented by one or more processors. The Receiving Component receives the data output by the Data Access Component and decodes the data output by the Data Access Component based at least in part on the Configuration File.

Variations and modifications can be made to these example aspects of the present disclosure.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION OF THE INVENTION

Figure 1:
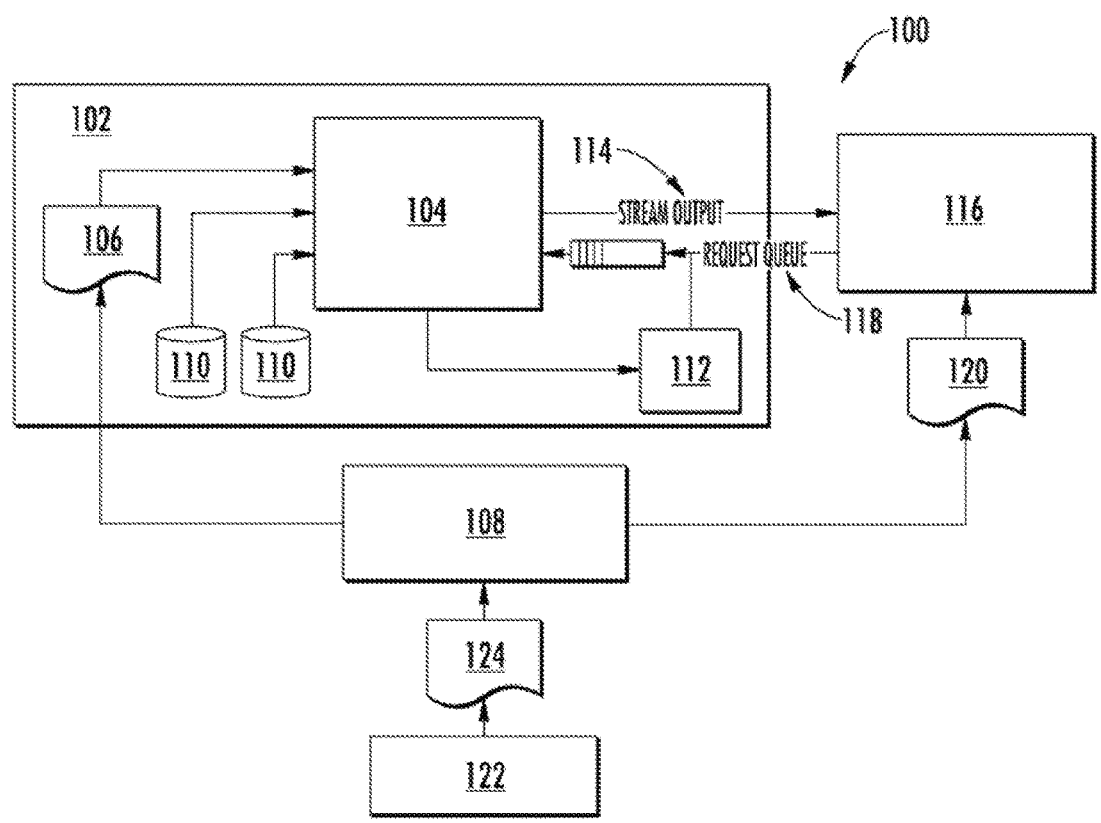
FIG. 1 depicts a block diagram of an example system for flexible access of internal data of an avionics system according to example embodiments of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Example aspects of the present disclosure are directed to systems and methods that enable flexible access to internal data of an avionics system (e.g., a Flight Management System, an Airport Surface Map System, etc.). In particular, as noted in the Background section, an interface that is defined at compile time in the software is typically required to access internal data from a Flight Management System. However, due to certification requirements and safety concerns, changing or altering the access interface necessitates additional testing and recertification. As a result of such additional testing and recertification requirements, the access interface can be difficult and costly to change. Accordingly, one advantage of the disclosed subject matter is to provide a method and system that enables flexible access of internal data of an avionics system (e.g., a Flight Management System).

Aspects of the present disclosure provide a technique to select, customize, or otherwise flexibly define data that is output by the avionics system during runtime. In particular, in some implementations, systems of the present disclosure can include a Configuration Tool that enables a system operator to make selections (e.g., via a user interface) of which data is thereafter output by or otherwise retrieved from the avionics system during runtime.

As one example, in some implementations, the Application Source Code of the avionics system can be parsed to create a Parsed Available Data File that lists data Topics available for subscription or access. The Parsed Available Data File can further include information about one or more parameters associated with each data Topic, size of each data Topic, one or more offsets associated with each data Topic, endianness of the Data Stores, byte alignment, or other information regarding the available data Topics and their anticipated storage structure.

The Configuration Tool can use the Parsed Available Data File to provide an interactive graphical user interface that allows the user to make selections of which data Topics are output by or otherwise retrieved from the avionics system during runtime. The user interface can enable the user to make various other selections regarding preferences for a number of other data settings or parameters, including, for example, output frequency for each data Topic, selected parameters for each data Topic, groups and sub-groups of Topics or Topic parameters, etc.

Based on such user selections, the Configuration Tool can generate a Loadable Configuration File that instructs or otherwise informs a Data Access Component of the avionics system regarding the identity of the data Topics selected by the user. Further, in some implementations, in addition identifying the Topics selected by the user, the Loadable Configuration can include additional information for each identified Topic, such as, for example, offsets, size, parameters, etc. In some implementations, the Loadable Configuration File can specify certain data groups that can be toggled during runtime of the avionics system.

In some implementations, in addition to the user selections, the Configuration Tool can generate the Loadable Configuration file based at least in part on other information such as, without limitation, a structure of data in one or more Data Stores of the avionics system, platform information, processor information, and/or one or more requirements associated with a Receiving Component that receives the selected data output by the avionics system. In addition, the Configuration Tool can also generate a Configuration File that can be used to decode the data output by the Data Access Component, as will be discussed further below.

The Data Access Component can subscribe to data in the Data Stores (e.g., particular data Topics) based on the Loadable Configuration File. In particular, the Data Access Component can output data from the subscribed Data Stores during runtime of the avionics system. In some implementations, the Data Access Component can output the data as a stream output to a Receiving Component. The Receiving Component can receive the data and decode the data based at least in part on the Configuration File received from the Configuration Tool.

The Receiving Component can be any device, program, application, or other system component for which the system operator desires to provide selected data from the avionics system. As examples, the Receiving Component can be a simulation system, a data recorder (e.g., a "black box"), an onboard maintenance system, an in-flight air-to-ground data transmission system, or any other device, system, or component for which receipt of particular user-selected avionics data is desired, including components internal to the avionics system.

Thus, aspects of the present disclosure provide a technique to customize or otherwise define data that is output by the avionics system during runtime. Furthermore, aspects of the present disclosure enable enhanced, flexible, and robust recording of flight test data, testing, debugging, and analyzing of in-service problems.

Although example aspects of the present disclosure are discussed with reference to avionics systems, the subject matter described herein can be used with or applied to provide flexible access to internal data of other systems, vehicles, machines, industrial or mechanical assets, or components without deviating from the scope of the present disclosure.

With reference now to the FIGS., example aspects of the present disclosure will be discussed in further detail.

FIG. 1 depicts a block diagram of an example system 100 for flexible access of internal data of an avionics system 102 according to example embodiments of the present disclosure. The avionics system 102 can include, but is not limited to, a Flight Management System.

In some implementations, the avionics system 102 executes, operates, or otherwise runs on a Framework that provides data and time management (e.g., scheduling). For example, the Framework can manage data (e.g., Topics), and threads or timing called processing functions. The processing functions can communicate with each other via the Topics. In some implementations, the Framework enables access to Topics in a thread-safe way. In some implementations, the Framework provides data management on a publish/subscription basis.

Figure 3:
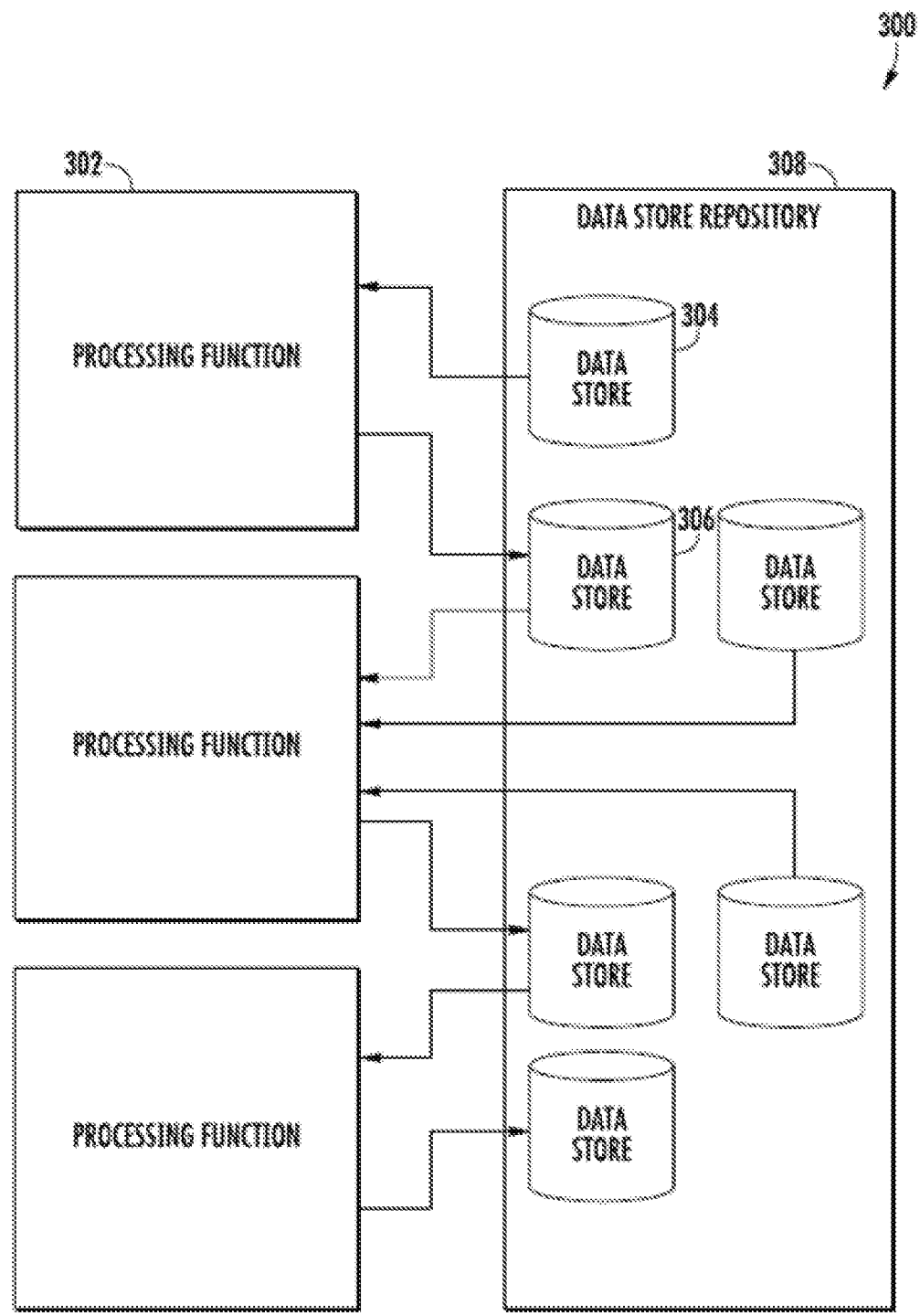
FIG. 3 depicts a block diagram of an example data access framework according to example embodiments of the present disclosure.

One example visualization of the Framework is provided in FIG. 3. Additional details regarding the Framework are included in commonly owned and copending U.S. patent application Ser. No. 14/486,325, filed Sep. 15, 2015, titled "Mechanism And Method For Communicating Between A Client And A Server By Accessing Message Data In A Shared Memory;" Ser. No. 14/486,336, filed Sep. 15, 2015, titled "Mechanism And Method For Accessing Data In A Shared Memory;" and Ser. No. 14/585,519. Use of the example Framework by the avionics system 102 is provided as one example only and the present disclosure is not limited by or to this example context. Other techniques, systems, or platforms that enable data access and/or management by the avionics system 102 can be used in addition or alternatively to the Framework.

Referring again to FIG. 1, the avionics system 102 includes a Data Access Component 104. The Data Access Component 104 executes, operates or otherwise runs based on a Loadable Configuration File 106 (Loadable Config File). For example, the Loadable Configuration File 106 can include instructions for the Data Access Component 104 to output predetermined data every 2 seconds.

Also illustrated in FIG. 1 is a Configuration Tool 108. The Configuration Tool 108 enables a user to select data to be output from the Data Access Component 104, and the frequency of said output. For example, the Configuration Tool 108 can include a program or graphic user interface through which the user picks data (e.g., Topics or certain parameters for certain Topics) from a predetermined set of data, and a frequency of output for the selected data.

In some implementations, the Configuration Tool 108 has prior knowledge of how data is maintained in the Data Stores 110, the platform environment, the processor, etc. Based on user input via the user interface, the Configuration Tool 108 can generate the Loadable Configuration File 106 (as shown in FIG. 1) that instructs the Data Access Component 104 to access data or Topics, and output the data based on selections made by the user.

In some implementations, the Data Access Component 104 parses the Loadable Configuration File 106 at startup and subscribes to a set of data or list of Topics based on a list or instructions contained in the Loadable Configuration File 106. In some implementations, the Data Access Component 104 can subscribe to the data or Topics through the use of string literals and generic data types, so that the data specification is not needed at run time, thereby making the interface more flexible.

In some implementations, in addition to specifying Topic names, the Loadable Configuration File 106 (Loadable Config File) can also specify particular data entries (e.g., parameters) within a Topic. The Loadable Configuration File 106 can provide instructions (e.g., offsets, type, size, etc.) regarding how many bytes are to be read. For example, an offset can describe a number of bytes from the beginning of the Topic where a particular data item starts; a size can describe a number of bytes that a particular data item occupies; and a type can define how to interpret those bytes.

The requested data specified by the Loadable Configuration File 106 can be grouped so a sub-group of data can be requested. Each group can output data at a defined rate and the Data Access Component 104 can manage run rates. This allows for limiting the amount of data output simultaneously by splitting it across multiple groups. The consumer of the data can then send requests to the Data Access Component to toggle the output as needed.

As one example, at each cycle the Data Access Component 104 can read data of the required Topics through a Framework-provided pointer and can extract individual data items based on the offsets and sizes (or types) defined in the Loadable Configuration File 106. The data can be output in human readable format (e.g., through a Console I/O 112) in which case the types can be used for casting. Thus, the Data Access Component 104 can perform conversion for console output.

Additionally or alternatively, the output data can be serialized into a byte stream and output as a Stream Output 114. For instance, the Stream Output 114 can include either ARINC 429 or ARINC 664, for example, where it is preferable to limit the data output to the maximum payload (e.g., about 8 Kbytes). Additionally or alternatively, pagination can be employed, for example, where multiple transmissions get indices as well as the maximum number of transmissions to expect for the receiver. The option of grouping can also be provided where not all data is needed contiguously.

Furthermore, the Data Access Component 104 can also provide protection mechanisms to avoid "draining" the system by requesting too much data. For example, Cyclic Redundancy Checks, public and private keys, or other encryption or security technology can be used, as described further below. These protection mechanisms can be in addition to mechanisms in the Configuration Tool 108. The Data Access Component 104 can also check the input file and make sure it meets a set of predetermined criteria (e.g., doesn't make invalid requests). For example, the Data Access Component 104 can ensure that the number of bytes requested per output group does not exceed a threshold value.

Further illustrated in FIG. 1 is a Receiving Component 116. The Receiving Component 116 can include a data recorder (e.g., a "black box"), an onboard maintenance system, or any other component or system for which customized data output is desired, including components both internal to or external to the avionics system 102.

In one example, the Receiving Component 116 can be a data communication/data downlink application. Therefore, a change in the message set (e.g., FANS 1/A+ to ATN B1) does not require a rebuild of the application. For example, the Receiving Component 116 can be a datalink application/partition of a Flight Management System.

The Receiving Component 116 can receive the Stream Output 114 from the Data Access Component 104. Additionally or alternatively, the Receiving Component 116 can request or trigger actions from the Data Access Component 104. For example, the Receiving Component 116 can trigger a data output from the Data Access Component 104 via a Request Queue 118 that is serviced by the Data Access Component 104. In some implementations, the Request Queue 118 can be used to send particular requests to enable and/or disable data output based on the different groups or sub-groups defined in the Loadable Configuration File 106.

The Receiving Component 116 can trigger data output from, or contract, the Data Access Component 104 in a plurality of ways, including but not limited to periodically (e.g., output data at a specified rate), on demand (e.g., a one-time request), or based on an event. For example, the Receiving Component 116 can trigger an output of data when an aircraft reaches cruising altitude. Events used as triggers can be predefined, and the data to be output can be configurable.

The Receiving Component 116 can enable robust and flexible access to aircraft data during testing. For example, partition-level testing may require access to data/Topics. Previously, for example, a hard-coded Bus (e.g., Air-Ground Equipment Bus) would be required to access the desired information/data. However, in view of the disclosures herein, the Receiving Component 116 can trigger a data output from the Data Access Component 104 and decode the received data.

In particular, the Configuration Tool 108 can further provide a Configuration File 120 to the Receiving Component 116 that enables the Receiving Component 116 to decode data obtained, acquired, or otherwise received from the Data Access Component 104. For example, data received from the Data Access Component 104 can be a set of serialized data (e.g., serialized bytes). The Receiving Component 116 can decode the serialized data based on information contained in the Configuration File 120.

In some implementations, the Configuration Tool 108 generates the Configuration File 120 based at least in part on prior knowledge of the platform environment, the Data Stores 110, the processor, avionics system software version, etc., which enables the Configuration tool 108 to instruct the Receiving Component 116 how to decode received data from the Data Access Component 104.

The Receiving Component 116 can decode the received data before or after recording. For example, the Receiving Component 116 can decode the received data while in flight or during post-processing. In addition, the Receiving Component 116 can ensure that it has an up-to-date Configuration File 120 to decode the data stream based on version information included in or associated with a Configuration File 120.

The Configuration Tool 108 provides an easy-to-use interface (e.g., GUI) that enables a user to set, choose, or otherwise select criteria (e.g., data, timing, etc.) for a Config File 120. The Configuration Tool 108 generates the Configuration File 120 based on awareness of the structure of the data in the Data Stores 110 (e.g., Topics) and requirements for the Receiving Component 116 to decode received information. The Configuration Tool 108 generates both the Loadable Configuration File 106 (Loadable Config File) for the Data Access Component 104 and the Configuration File 120 (Config File) for the Receiving Component 116.

In some implementations, the Configuration Tool 108 or other system component parses a set of Application Source Code 122 to provide a list of all available Topics. The Application Source Code 122 can be the source code of the avionics system 102. In particular, the Application Source Code 122 can describe or otherwise contain the structure of the Data Stores 110 or other information about the structure and/or operation of the avionics system 102 and/or the Framework. Parsing the Application Source Code 122 can result in a Parsed Available Data File 124 which contains a list of all available Topics and/or other information (e.g., topic parameters, sizes, offsets, etc.).

In some implementations, in addition to the Application Source Code 122, the Configuration Tool 108 can analyze or otherwise use one or more binary object files of the avionics system 102 to determine the memory layout of the system 102. For example, a compiler can optionally create a context clause (which also may be known as a representation specification). This context clause can contain tables describing the memory layout. The Configuration Tool 108 can use the context clause as an input in addition to the Source Code 122 (which can still be used to determine dependencies of nested data structures).

Based on the target processor architecture (e.g., the processor which implements the Data Access Component 104), the Configuration Tool 108 is also aware of byte alignment and endianness to adjust offsets in the Loadable Config File 120. The endianness information is used by the Receiving Component 116 to decode the data stream. The Configuration Tool 108 may also account for units of each data item either through meta data in the Application Source Code 122 or through the type definition name (e.g., Feet_Type). Additionally or alternatively, the Configuration Tool 108 can enable the user to update, change, or otherwise add the meta data. For example, where the Configuration Tool 108 cannot infer the meta data, the user can add meta data that will be maintained for future use.

Thus, the Parsed Available Data File 124 can be a representation of the Application Source Code 122 that the Configuration Tool 108 can use to generate both the Loadable Config File 106 and the Config File 120 for the Receiving Component 116. This intermediate data file 124 can be used to provide the Configuration Tool 108 to a third party (e.g., customer) and allow them to create their own Loadable Config Files 106 while limiting scope and visibility to the Application Source Code 122.

Creation of rogue Config Files, for example, where someone does a trial and error test to extract undesired data, or attempts to crash the software, can be prevented by applying a Cyclic Redundancy Check (CRC) to the Loadable Config Files 106 and/or Config Files 120 (e.g., with only the Data Access Component 104 knowing how to calculate it) or using any other form of a hash or electronic signature.

In some implementations, the Loadable Config File 106 and the Config File 120 can have maximum size limits. Likewise, the contents of the file can have a group number limit. This can influence the memory and request interface sizes internal to the Data Access Component 104.

Each of the Configuration Tool 108, the Data Access Component 104, and the Receiving Component 116 can be implemented by one or more computing devices. As used herein, a "computing device" can include one or more processors and a memory. The one or more processors can be can be any suitable processing device (e.g., a processor core, a microprocessor, an ASIC, a FPGA, a controller, a microcontroller, etc.) and can be one processor or a plurality of processors that are operatively connected. The memory can include one or more non-transitory computer-readable storage mediums, such as RAM, ROM, EEPROM, EPROM, flash memory devices, magnetic disks, etc., and combinations thereof. The memory can store instructions which are executed by the processor to perform operations.

In one particular non-limiting example, the Configuration Tool 108 is implemented by a first computing device that is located in a ground station; the avionics system 102 (including the Data Access Component 104) is implemented by a second computing device that is on-board an aircraft; and the Receiving Component is implemented by a third computing device that is located on-board the aircraft. However, the previous distribution is provided as one example only. Many other and different distributions of computing functionality can be used.

In some implementations, each of the Configuration Tool 108, the Data Access Component 104, and the Receiving Component 116 correspond to or otherwise include computer logic utilized to provide desired functionality. Thus, each of the Configuration Tool 108, the Data Access Component 104, and the Receiving Component 116 can be implemented in hardware, application specific circuits, firmware and/or software controlling a general purpose processor. In one implementation, each of the Configuration Tool 108, the Data Access Component 104, and the Receiving Component 116 correspond to program code files stored on a storage device, loaded into memory and executed by a processor or can be provided from computer program products, for example computer executable instructions, that are stored in a tangible computer-readable storage medium such as RAM, hard disk or optical or magnetic media. In some implementations, each of the Data Stores 110 can include some form of non-transitory computer-readable storage media, including, for example, volatile and/or non-volatile memory, databases, etc.

Figure 2:
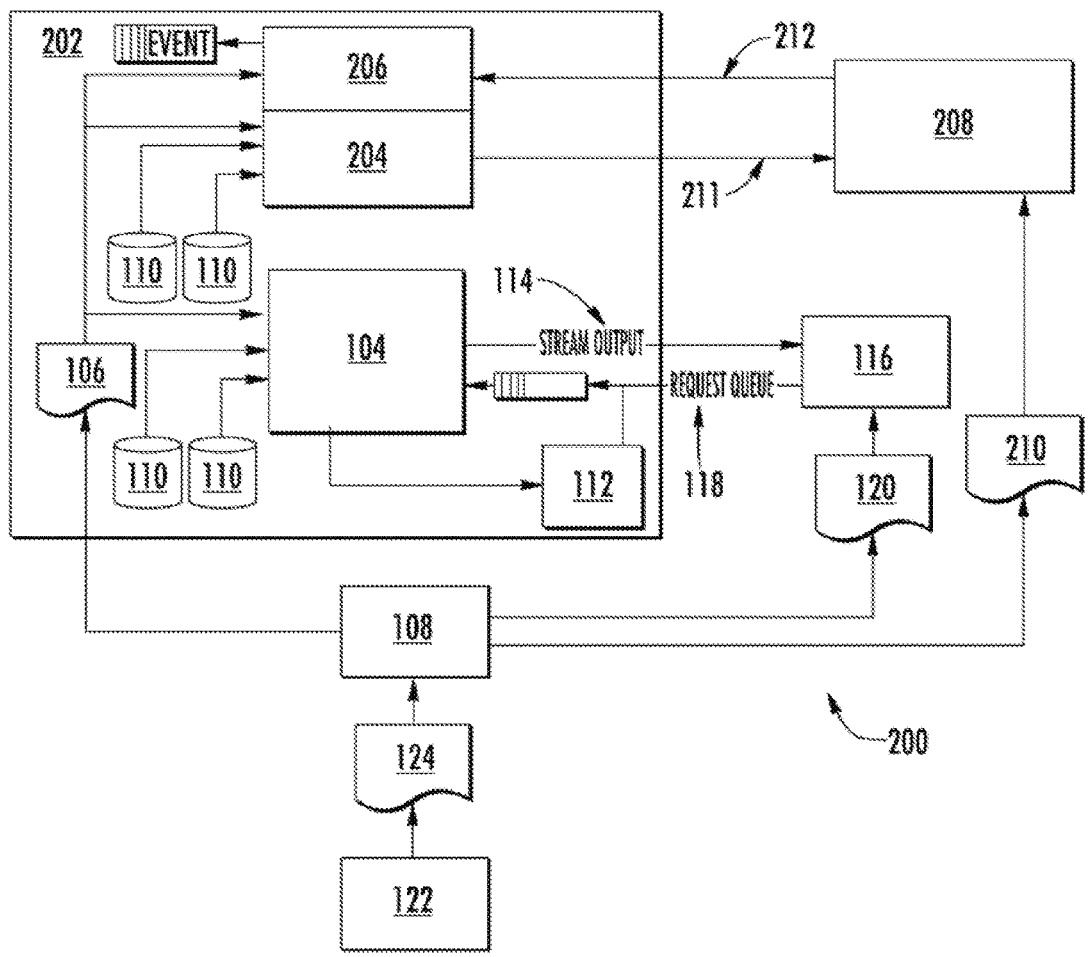
FIG. 2 depicts a block diagram of an example system for flexible access of internal data of an avionics system according to example embodiments of the present disclosure.

Referring now to FIG. 2, illustrated is a second example system 200 for flexible access of internal data of an avionics system 202 according to example embodiments of the present disclosure. The avionics system 202 can include, but is not limited to, a Flight Management System.

The system 200 of FIG. 2 is largely similar to the system 100 of FIG. 1, as indicated by the inclusion of many identically numbered components. For example, the system 200 includes the Configuration Tool 108, the Data Access Component 104, the Receiving Component 116, and many other identically numbered components which are discussed with reference to FIG. 1.

However, in addition to a Data Access Component 104, the avionics system 202 of FIG. 2 further includes a User Interface Painter 204 and a User Interface Handler 206. In some implementations, the User Interface Painter 204 and/or the User Interface Handler 206 can be table-based or otherwise table driven.

The User Interface Painter 204 can also receive the Loadable Configuration File 106 from the Configuration Tool 108. Based on the Topics identified by the Loadable Configuration File 106, the User Interface Painter 204 can subscribe to certain Data Stores 110 upon power up or initial execution of the system 202. The User Interface Painter 204 can also provide file protections (e.g., CRC, throughput, names, etc.) in a manner similar to that provided by the Data Access Component 104. In addition, the User Interface Painter 204 can perform conversions for units, resolutions, or other parameters.

The User Interface Painter 204 can output or otherwise provide the data obtained from the Data Stores 110 to a Display Unit 208, for example, as illustrated at 211. In some implementations, the Display Unit 208 can be a multifunction control display unit. The Display Unit 208 can include one or more screens for displaying data and can also include one or more buttons or other controls for receiving user input. Thus, the User Interface Painter 204 and the Display Unit 208 can cooperatively operate to enable the display of user-selected data, as guided by the Loadable Configuration File 106.

In some implementations, the Display Unit 208 can operate according to the ARINC 661 standard. Thus, the data 211 provided from the User Interface Painter 204 to the Display Unit 208 can be formatted into ARINC 661 blocks.

Similar to the Configuration File 120, the Display Unit 208 can receive a UADF Configuration File 210 that was generated by the Configuration Tool 108. The UADF Configuration File 210 can enable the Display Unit 208 to decode the data 211 received from the User Interface Painter 204. For example, the UADF Configuration File 210 can be a ARINC 661 UADF Configuration File.

The User Interface Handler 206 can also subscribe to one or more Data Stores 110 upon power up. In particular, in some implementations, the User Interface Painter 204 and the User Interface Handler 206 can be portions of the same component or otherwise cooperatively operate.

The User Interface Handler 206 can provide an interface for incoming events from the Display Unit 208. For example, user input received by the Display Unit 208 can be provided to the User Interface Handler 206, as illustrated at 212. In some implementations, the data 212 provided from the Display Unit 208 to the User Interface Handler 206 can be formatted into ARINC 661 blocks.

Thus, the Loadable Configuration File 106 can be used to customize or other select particular data to be provided from the avionics system 202 to both a Receiving Component 116 (e.g., data recorder) and a Display Unit 208 (e.g., MCDU). Other components that are not specifically illustrated can receive customized data outputs as well. In some implementations, the Configuration Tool 108 enables separate customization and user selection of different data to be respectively output to the Receiving Component 116 and the Display Unit 208. In particular, two or more Loadable Configuration Files 106 can be generated which provide or reflect different user selections of customized output data respectively for the Receiving Component 116 and the Display Unit 208, and potentially other components as well.

Each of the User Interface Painter 204 and the User Interface Handler 206 can be implemented by one or more computing devices. In some implementations, each of the User Interface Painter 204 and the User Interface Handler 206 correspond to or otherwise include computer logic utilized to provide desired functionality. Thus, each of the User Interface Painter 204 and the User Interface Handler 206 can be implemented in hardware, application specific circuits, firmware and/or software controlling a general purpose processor. In one implementation, each of the User Interface Painter 204 and the User Interface Handler 206 correspond to program code files stored on a storage device, loaded into memory and executed by a processor or can be provided from computer program products, for example computer executable instructions, that are stored in a tangible computer-readable storage medium such as RAM, hard disk or optical or magnetic media.

Turning now to FIG. 3, illustrated is an example Framework 300 for communication of data in an avionics system in accordance with various aspects described herein. As discussed, the Framework 300 provides data and time management. For example, the Framework 300 can manage data (e.g., Topics) and can manage threads or timing called processing functions. For instance, the Framework 300 can manage a first processing function that runs every 200 ms and performs a first task, and at the same time a second processing function that runs every 1 s and performs a second task. The Framework 300 can include a set of Data Stores or Topics and a set of mail slots. The Framework 300 enables accessing data from the Data Stores and mail slots.

Referring to FIG. 3, a set of processing functions (e.g., processing function 302) are in communication with, linked to, or otherwise connected to the Framework 300. The processing functions can execute, operate or otherwise run at flexible or rigid times. The processing functions 302 can access data from a set of Data Stores (e.g., Data Stores 304 and 306) included in a Data Store Repository 308 maintained by the Framework 300. For example, the processing function 302 is illustrated as accessing or otherwise interacting with the Data Stores 304 and 306 of the Data Store Repository 308.

The Framework 300 enables access of data items (e.g., Topics) by name (e.g., via string literals). By knowing the name that will be used in the Configuration File, the Configuration Tool can specify the name of the data in which the user is interested. The Data Access Component can parse the Configuration File to subscribe to the appropriate Data Stores.

In particular, whenever the system is restarted, the Data Access Component can load the Configuration File and subscribe/re-subscribe to the desired data. Additionally or alternatively, data groups can be specified to toggle the data being output at runtime and the Data Access Component 104 can parse and subscribe to all potential groups.

Figure 4:
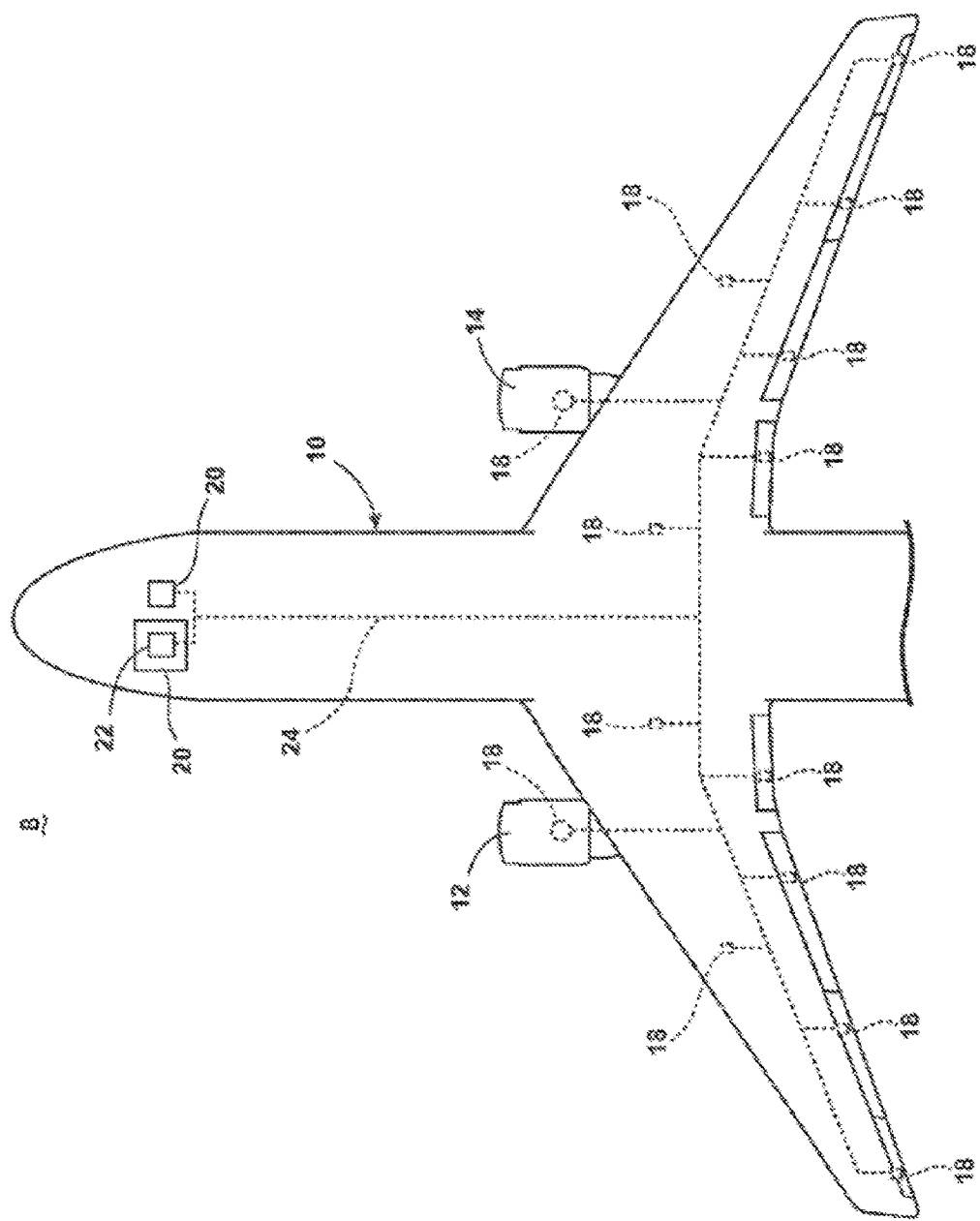
FIG. 4 depicts a top down schematic view of an example aircraft according to example embodiments of the present disclosure.

Referring now to FIG. 4, an example aircraft 8 is shown having a fuselage 10 and at least one turbine engine, shown as a left engine system 12 and a right engine system 14. The left and right engine systems 12, 14 may be substantially identical. While turbine engines 12, 14 are illustrated, the aircraft 8 may include fewer or additional engine systems, or alternative propulsion engine systems, such as propeller-based engines.

The aircraft 8 is shown further comprising a plurality of sensors, systems, and components, collectively referred to as line-replaceable units (LRUs) 18, and at least one server 20 or computing unit, shown as two flight management systems, or flight control computers, located proximate to each other, near the nose of the aircraft 8. At least one of the servers 20 may further include memory 22.

The LRUs 18 and servers 20 may be communicatively interconnected by transmission and/or communication lines defining a data communications network 24, traversing at least a portion of the aircraft 8. Additional LRUs 18 may be included. While a server 20 is described, embodiments of the invention may include any computing system, flight computer, or display system displaying data from multiple systems.

The memory 22 may include random access memory (RAM), flash memory, or one or more different types of portable electronic memory, etc., or any suitable combination of these types of memory. The LRUs 18 and/or servers 20 may be operably coupled with the memory 22 such that the LRUs 18 and/or servers 20, or any computer programs or processes thereon, may access at least a portion of the memory 22 (e.g. "shared memory" 22).

The aircraft 8 shown in FIG. 4 is merely a schematic representation of one example embodiment of the invention, and used to illustrate that a plurality of LRUs 18 and servers 20 may be located throughout the aircraft 8. The exact location of the LRUs 18 and servers 20 are not germane to the embodiments of the invention. Additionally, more or fewer LRUs 18 and/or servers 20 may be included in embodiments of the invention.

The communications network 24 is illustrated as a bus, but may include a number of data communication connectors and interfaces, for example, Ethernet or fiber-optic cables, and routing and/or switching components, to facilitate the communicative interconnection between the LRUs and Servers 20. Furthermore, the configuration and operation of the communications network 24 may be defined by a common set of standards or regulations applicable to particular aircraft environments. For example, the communications network 24 on an aircraft 8 may be defined by, and/or configured according to, the ARINC 664 (A664) standard, or ARINC 653 (A653) standard.

Figure 5:
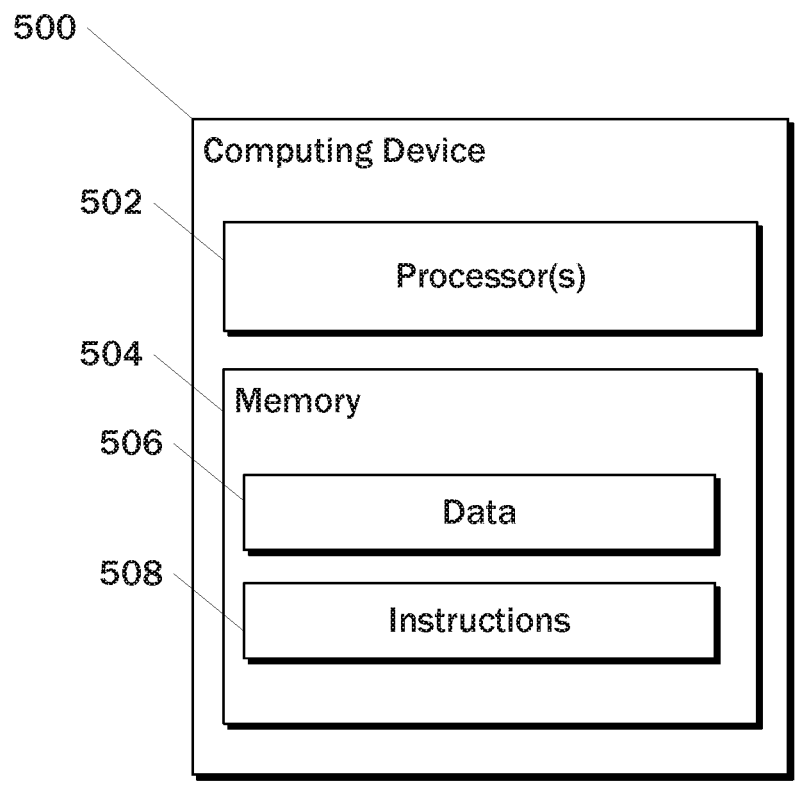
FIG. 5 depicts a block diagram of an example computing device according to example embodiments of the present disclosure.

Referring now to FIG. 5, a block diagram of an example computing device 500 is illustrated. In some implementations, the computing device 500 can be referred to as a controller or a microcontroller. The computing device 500 can be stand-alone or can be embedded into a computing system, such as the avionics system 102 of FIG. 1.

The computing device 500 can include one or more processors 502 and a memory 504. The one or more processors 502 can be can be any suitable processing device (e.g., a processor core, a microprocessor, an ASIC, a FPGA, a controller, a microcontroller, etc.) and can be one processor or a plurality of processors that are operatively connected. The memory 504 can include one or more non-transitory computer-readable storage mediums, such as RAM, ROM, EEPROM, EPROM, flash memory devices, magnetic disks, etc., and combinations thereof. The memory 504 can store data 506, such as data Topics in Data Stores. The memory 504 can also store instructions 508 which are executed by the processor 502 to perform operations described by the present disclosure.

It is readily apparent that an advantage of the present disclosure is that it enables truly configurable and dynamic access to the data without the need to recompile and recertify the aircraft system (e.g., Flight Management System). The Configuration Tool includes a proprietary data file that allows any licensed user to generate a Loadable Config File in a simple and robust fashion.

The technology discussed herein makes reference to servers, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, server processes discussed herein may be implemented using a single server or multiple servers working in combination. Databases and applications may be implemented on a single system or distributed across multiple systems. Distributed components may operate sequentially or in parallel.

Although specific features of various embodiments may be shown in some drawings and not in others, this is for convenience only. In accordance with the principles of the present disclosure, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims. Accordingly, the invention is not to be limited to any single embodiment or implementation, but rather can be construed in breadth, spirit and scope in accordance with the appended claims.

What is claimed is:

1. A method to provide flexible access to internal data of an avionics system, the method comprising:

receiving, by a Data Access Component of the avionics system, a Loadable Configuration File that specifies one or more data Topics selected by a user, the Data Access Component implemented by one or more processors;

accessing, by the Data Access Component, one or more Data Stores that contain the internal data of the avionics system to retrieve data associated with the one or more data Topics specified by the Loadable Configuration File;

outputting, by the Data Access Component, the retrieved data to a Receiving Component;

providing, by a Configuration Tool, a user interface that enables the user to select the one or more data Topics from a set of available Topics, the Configuration Tool implemented by one or more processors;

receiving, by the Configuration Tool via the user interface, a user input that selects the one or more data Topics from the set of available Topics;

generating, by the Configuration Tool, the Loadable Configuration File based at least in part on the received user input, wherein the Loadable Configuration File specifies the one or more data Topics and one or more of an offset and a size associated with each Topic; and providing the Loadable Configuration File to the Data Access Component.

2. The method of claim 1, further comprising:

generating, by the Configuration Tool, a Configuration File based at least in part on the received user input; and providing the Configuration File to the Receiving Component.

3. The method of claim 2, further comprising:

decoding, by the Receiving Component, the data output by the Data Access Component based on the Configuration File, the Receiving Component implemented by one or more processors.

4. The method of claim 1, further comprising:

obtaining, by the Configuration Tool, a Parsed Available Data File that lists the set of available Topics; and generating, by the Configuration Tool based on the Parsed Available Data File, the user interface that enables the user to select the one or more data Topics from the set of available Topics.

5. The method of claim 4, further comprising:

parsing an Application Source Code associated with the avionics system to obtain the Parsed Available Data File.

6. The method of claim 1, wherein accessing, by the Data Access Component, the one or more Data Stores to retrieve the data associated with the one or more data Topics comprises subscribing, by the Data Access Component, to the Data Stores that contain the data associated with the one or more data Topics.

7. The method of claim 1, wherein accessing, by the Data Access Component, the one or more Data Stores to retrieve the data associated with the one or more data Topics comprises:

receiving, by the Data Access Component, a request for a particular set the data associated with the one or more data Topics from the Receiving Component; and in response to receipt of the request, accessing, by the Data Access Component, the one or more Data Stores to retrieve the data associated with the one or more data Topics.

8. The method of claim 1, wherein:

the Loadable Configuration File defines a plurality of different Topic groups; and accessing, by the Data Access Component, the one or more Data Stores to retrieve the data associated with the one or more data Topics comprises:

determining, by the Data Access Component based on the Loadable Configuration File, a rate at which each of the plurality of Topic groups should be output; and accessing, by the Data Access Component, the one or more Data Stores according to the respective determined rates to retrieve each Topic group at its respective rate.

9. The method of claim 1, further comprising:

receiving, by a User Interface Painter of the avionics system, the Loadable Configuration File that specifies one or more data Topics selected by the user, the User Interface Painter implemented by one or more processors;

accessing, by the User Interface Painter, the one or more Data Stores that contain the internal data of the avionics system to retrieve the data associated with the one or more data Topics specified by the Loadable Configuration File; and outputting, by the User Interface Painter, the retrieved data to a Display Unit.

10. The method of claim 9, further comprising:

receiving, by a User Interface Handler of the avionics system, one or more events from a Display Unit, wherein the one or more events correspond to user input received at the Display Unit; and providing, by the User Interface Handler, an interface for the events to the Data Access Component.

11. A method to provide flexible access to internal data of an avionics system, the method comprising:

generating, via a Configuration Tool, a Loadable Configuration File and a Configuration File based on user selections, structure of data in Data Stores, platform information, processor information, and Receiving Component requirements;

subscribing, via a Data Access Component, to data in the Data Stores based on the Loadable Configuration File;

outputting, via the Data Access Component, the data received from the Data Stores;

receiving, via a Receiving Component, the data output by the Data Access Component;

decoding, via the Receiving Component, the data based at least in part on the Configuration File;

providing, via the Configuration Tool, a user interface that enables a user to select one or more data Topics from a set of available Topics; and receiving, via the Configuration Tool, a user input that selects the one or more data Topics from the set of available Topics;

wherein generating, via the Configuration Tool, the Loadable Configuration File and the Configuration File based on user selections comprises generating, via the Configuration Tool, the Loadable Configuration File and the Configuration File based on the one or more data Topics selected by the user input.

12. The method of claim 11, further comprising:

obtaining, via the Configuration Tool, a Parsed Available Data File that lists the set of available Topics; and generating, via the Configuration Tool based on the Parsed Available Data File, the user interface that enables the user to select the one or more data Topics from the set of available Topics.

13. The method of claim 12, further comprising:

parsing an Application Source Code associated with the avionics system to obtain the Parsed Available Data File.

14. A system, comprising:

a Configuration Tool implemented by one or more processors, wherein the Configuration Tool generates a Loadable Configuration File and a Configuration File based on user selections and at least one of a structure of data in one or more Data Stores, platform information, processor information, and one or more Receiving Component requirements;

a Data Access Component implemented by one or more processors, wherein the Data Access Component subscribes to data in the Data Stores based on the Loadable Configuration File and outputs the data; and a Receiving Component implemented by one or more processors, wherein the Receiving Component receives the data output by the Data Access Component and decodes the data output by the Data Access Component based at least in part on the Configuration File; wherein the Configuration Tool, obtains a Parsed Available Data File that describes a set of available Topics;

provides a user interface that enables a user to select one or more of the Topics; and generates the Loadable Configuration File based at least in part on the Topics selected by the user.

15. The system of claim 14, further comprising:

a User Interface Painter implemented by one or more processors, wherein the User Interface Painter subscribes to data in the Data Stores based on the Loadable Configuration File and outputs the data to a Display Unit.

16. The system of claim 15, further comprising the Display Unit.

17. The system of claim 14, further comprising:

a User Interface Handler that provides an interface for events received from a Display Unit.

* * * * *